(12) United States Patent
Karlapalem et al.

(10) Patent No.: US 12,335,118 B2
(45) Date of Patent: Jun. 17, 2025

(54) SYSTEM AND METHOD FOR VISUALIZING LARGE GRAPH DATA USING SPIRALS

(71) Applicant: International Institute of Information Technology, Hyderabad, Hyderabad (IN)

(72) Inventors: Kamalakar Karlapalem, Hyderabad (IN); Garima Jindal, Hyderabad (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 55 days.

(21) Appl. No.: 18/385,919

(22) Filed: Nov. 1, 2023

(65) Prior Publication Data

US 2024/0146627 A1  May 2, 2024

(30) Foreign Application Priority Data

Nov. 2, 2022  (IN) .............................. 202241062679

(51) Int. Cl.
*H04L 43/045*  (2022.01)
*H04L 41/22*  (2022.01)

(52) U.S. Cl.
CPC ............ *H04L 43/045* (2013.01); *H04L 41/22* (2013.01)

(58) Field of Classification Search
CPC ..... H04L 43/045; H04L 41/22; H04L 41/145; H04L 41/0893; G06F 16/9024
See application file for complete search history.

(56) References Cited

U.S. PATENT DOCUMENTS

| | | | |
|---|---|---|---|
| 7,024,419 B1* | 4/2006 | Klenk ...................... | H04L 41/22 707/999.102 |
| 2017/0323028 A1* | 11/2017 | Jonker ................ | G06F 16/9024 |
| 2018/0053327 A1* | 2/2018 | Contractor ............ | G06T 11/206 |
| 2020/0035002 A1* | 1/2020 | Epasto ....................... | G06T 9/00 |
| 2021/0109972 A1* | 4/2021 | Boudin ................. | G06T 11/206 |
| 2021/0233295 A1* | 7/2021 | Indurkhya ............. | G06F 16/904 |

* cited by examiner

*Primary Examiner* — Johnny B Aguiar

(57) ABSTRACT

A system and method for visualizing large graph data using spirals are provided. The method includes (i) generating communities from an input graph data, (ii) configuring nodes in the communities in an ascending order based on a centrality measure, (iii) determining a spiral for the communities by configuring (a) a node with a highest centrality measure at a spiral center and (b) the nodes in a spiral shape based on the ascending order of the centrality measure along the spiral shape, (iv) determining a first super edge for the spiral of the communities, (v) generating a coarse graph using super nodes, the first super edge, and a second super edge, (vi) configuring, using a standard force-directed layout algorithm, corresponding spirals of the communities on the generated coarse graph based on a weight of the second super edge and attractive forces to generate the visualization of the large graph data.

15 Claims, 7 Drawing Sheets

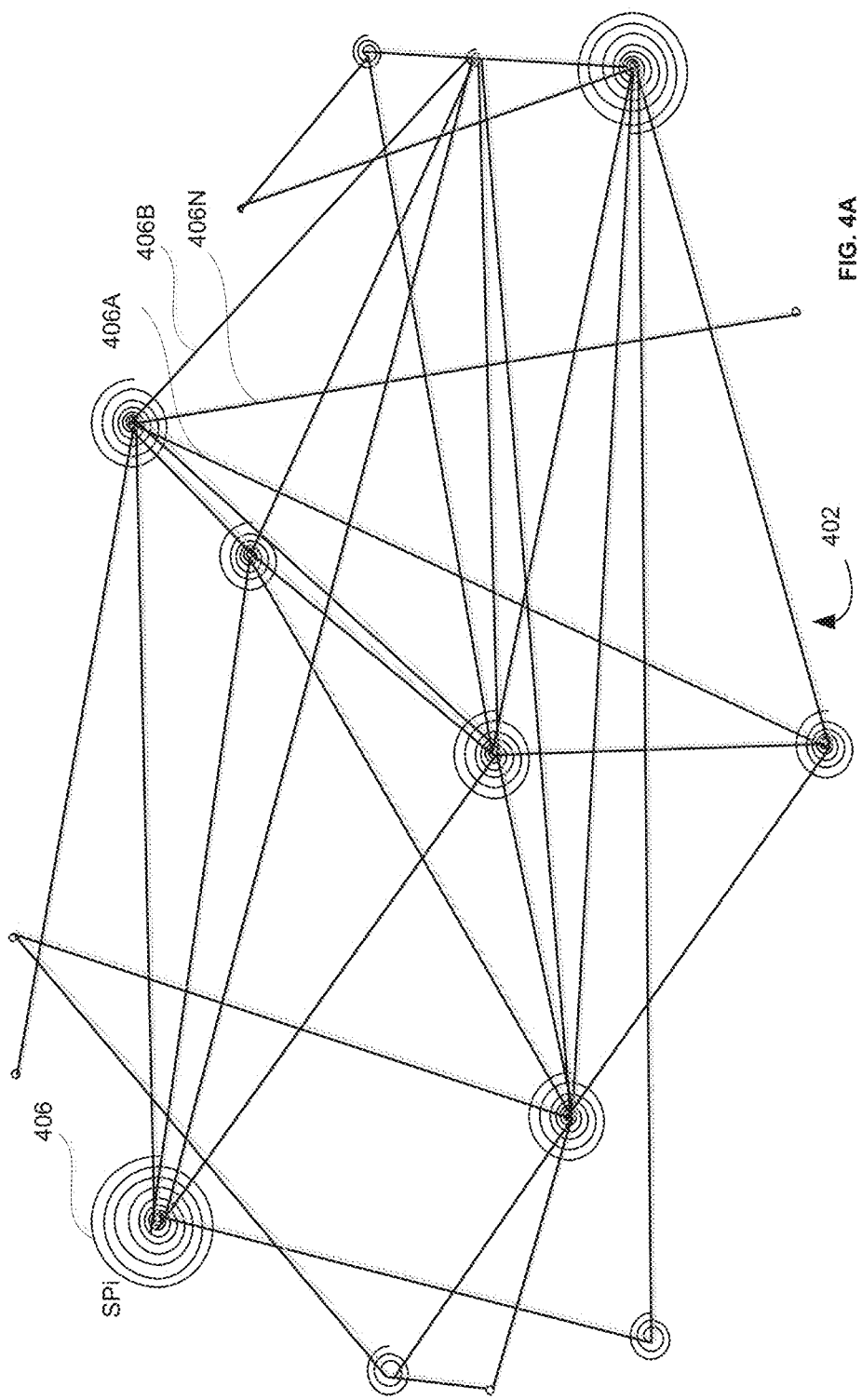

SYSTEM AND METHOD FOR VISUALIZING LARGE GRAPH DATA USING SPIRALS

CROSS-REFERENCE TO RELATED APPLICATIONS

This patent application claims priority to Indian provisional patent application no. 202241062679 filed on Nov. 2, 2022, the complete disclosures of which, in their entirety, are hereby incorporated by reference.

TECHNICAL FIELD

The embodiments herein generally relate to data visualization of large graph data, more particularly to a system and method for visualizing large graph data using spirals to reduce visual clutter.

DESCRIPTION OF THE RELATED ART

Large networks, like the Internet and social networks, are difficult to visualize because they have many nodes. It's important to identify influential nodes for various purposes, such as preventing epidemics or improving transportation. Automatic algorithms can calculate node centrality but fail to provide a complete understanding of a node's importance within and across communities.

Existing visualization techniques are used for displaying networks and their communities. The existing visualization techniques utilize chord diagrams along with node-link diagrams to represent dense subgraphs or communities in a network while showing the global network structure. The existing visualization techniques visualize the local structure of communities within a larger network. The existing visualization techniques can also highlight central nodes based on their degree and betweenness centrality. The existing visualization techniques allow for visualizing both the local relationships within communities and the overall connectivity patterns across different communities.

The existing visualization techniques are suitable for medium-sized networks but may not be effective for visualizing large graphs with hundreds or thousands of nodes due to visual clutter and limited scalability. Additionally, the existing visualization techniques primarily focus on community structures and interconnections rather than specifically visualizing individual node centrality measures like closeness or eigenvector centrality.

Other existing visualization techniques are grid-like visualizations of networks that show connections between nodes. The other existing visualization techniques are useful for dense graphs and community analysis, but may not effectively represent node centrality measures beyond degree centrality. The other existing visualization techniques combine different techniques to overcome these limitations and provide a comprehensive view of network structure and communities. Examples include Group-in-a-Box (GIB), which organizes complex networks into spatial regions and integrates node-link diagrams and adjacency matrices. However, quantitatively representing node centrality can still be challenging in these approaches.

Accordingly, there remains a need to address the aforementioned technical drawbacks in existing technologies.

SUMMARY

In view of the foregoing, there is provided a processor-implemented for generating a visualization of large graph data associated with a plurality of communities using a plurality of spirals to reduce visual clutter. The method includes generating, using a community detection method, the at least one community by grouping a plurality of nodes associated with a graph structure of data networks associated with input graph data, the input graph data comprises data that is represented as the graph structure of data networks, the graph structure comprises the nodes, and edges that represent interconnections between the nodes. The method includes configuring the at least one node in the at least one community in an ascending order based on a centrality measure, the centrality is a measure of an importance of corresponding node. The method includes determining the at least one spiral for the at least one community by configuring (i) the corresponding node with a highest centrality measure at a spiral center and (ii) the at least one node in a spiral shape based on the ascending order of the centrality measure along the spiral shape. The method includes determining a first super edge for the at least one spiral of the at least one community by (i) removing all edges between two communities to merge as a single edge, and (ii) connecting corresponding two spiral centers of two spirals of the two communities. The method includes generating a coarse graph using super nodes, the first super edge, and a second super edge, the super nodes are determined by (i) merging all nodes of the at least one spiral as a super-node, and the second super edge is obtained by representing an edge between two super nodes if there is the edge between a first subset of nodes in a first community and a second subset of nodes in a second community. The method includes configuring, using a standard force-directed layout algorithm, corresponding spirals of the at least one community on the generated coarse graph based on a weight of the second super edge between the first community and the second community and attractive forces between the first community and the second community to generate the visualization of the large graph data associated with the at least one community.

In some embodiments, the method includes determining the centrality measure of the at least one node by determining an inverse of a sum of a shortest path distances from the at least one node to all other nodes in the graph structure.

In some embodiments, the method further includes determining characteristics of the at least one spiral for each community, the characteristics of the at least one spiral for the at least one community comprises (i) a spiral radius is proportional to a number of nodes in the at least one community, and (ii) a color of the at least one spiral for the at least one community represents an edge density within the at least one community.

In some embodiments, the method further includes visualizing the at least one spiral using interactive features comprising a tooltip, an on-hover highlight, a zooming and panning, and a click on the at least one spiral.

In some embodiments, the method further includes determining a width or weight of the second super edge by a count of a number of edges between the first community and the second community.

In some embodiments, the method further includes determining the attractive forces between the first community and the second community or repulsive forces that act between all pairs of super nodes by iteratively determining resulting forces on each super node and attempts to move the super nodes closer to an equilibrium state by (i) simulating the coarse graph as a physical system, (ii) considering each super node as a repelling object, and each second super edge as a spring connecting the two super nodes, wherein the resulting forces comprise the repulsive forces or the attractive forces.

In some embodiments, the method further includes determining coordinates of each node in the at least one community by varying a distance from the spiral center and an angle of rotation, the angle of rotation is calculated by a perimeter of a circle whose radius is a ratio of a maximum radius of any spiral and a maximum number of nodes that are placed in any spiral.

In one aspect, one or more non-transitory computer-readable storage medium storing the one or more sequence of instructions, which when executed by the one or more processors, causes to perform a method for generating a visualization of large graph data associated with a plurality of communities using a plurality of spirals to reduce visual clutter. The method includes generating, using a community detection method, the at least one community by grouping a plurality of nodes associated with a graph structure of data networks associated with input graph data, the input graph data comprises data that is represented as the graph structure of data networks, the graph structure comprises the nodes, and edges that represent interconnections between the nodes. The method includes configuring the at least one node in the at least one community in an ascending order based on a centrality measure, the centrality is a measure of an importance of corresponding node. The method includes determining the at least one spiral for the at least one community by configuring (i) the corresponding node with a highest centrality measure at a spiral center and (ii) the at least one node in a spiral shape based on the ascending order of the centrality measure along the spiral shape. The method includes determining a first super edge for the at least one spiral of the at least one community by (i) removing all edges between two communities to merge as a single edge, and (ii) connecting corresponding two spiral centers of two spirals of the two communities. The method includes generating a coarse graph using super nodes, the first super edge, and a second super edge, the super nodes are determined by (i) merging all nodes of the at least one spiral as a super-node, and the second super edge is obtained by representing an edge between two super nodes if there is the edge between a first subset of nodes in a first community and a second subset of nodes in a second community. The method includes configuring, using a standard force-directed layout algorithm, corresponding spirals of the at least one community on the generated coarse graph based on a weight of the second super edge between the first community and the second community and attractive forces between the first community and the second community to generate the visualization of the large graph data associated with the at least one community.

In another aspect, a system for generating a visualization of large graph data associated with a plurality of communities using a plurality of spirals to reduce visual clutter is provided. The system includes a device processor and a non-transitory computer-readable storage medium storing one or more sequences of instructions, which when executed by the device processor, causes (i) generating, using a community detection method, the at least one community by grouping a plurality of nodes associated with a graph structure of data networks associated with input graph data, the input graph data comprises data that is represented as the graph structure of data networks, the graph structure comprises the nodes, and edges that represent interconnections between the nodes, (ii) configuring the at least one node in the at least one community in an ascending order based on a centrality measure, the centrality is a measure of an importance of corresponding node, (iii) determining the at least one spiral for the at least one community by configuring (a) the corresponding node with a highest centrality measure at a spiral center and (b) the at least one node in a spiral shape based on the ascending order of the centrality measure along the spiral shape, (iv) determining a first super edge for the at least one spiral of the at least one community by (m) removing all edges between two communities to merge as a single edge, and (n) connecting corresponding two spiral centers of two spirals of the two communities, (v) generating a coarse graph using super nodes, the first super edge, and a second super edge, the super nodes are determined by (x) merging all nodes of the at least one spiral as a super-node, and the second super edge is obtained by representing an edge between two super nodes if there is the edge between a first subset of nodes in a first community and a second subset of nodes in a second community, and (vi) configuring, using a standard force-directed layout algorithm, corresponding spirals of the at least one community on the generated coarse graph based on a weight of the second super edge between the first community and the second community and attractive forces between the first community and the second community to generate the visualization of the large graph data associated with the at least one community.

In some embodiments, the processor is configured to determine the centrality measure of the at least one node by determining an inverse of a sum of a shortest path distances from the at least one node to all other nodes in the graph structure.

In some embodiments, the processor is configured to determine characteristics of the at least one spiral for each community, the characteristics of the at least one spiral for the at least one community comprises (i) a spiral radius is proportional to a number of nodes in the at least one community, and (ii) a color of the at least one spiral for the at least one community represents an edge density within the at least one community.

In some embodiments, the processor is configured to visualize the at least one spiral using interactive features comprising a tooltip, an on-hover highlight, a zooming and panning, and a click on the at least one spiral.

In some embodiments, the processor is configured to determine a width or weight of the second super edge by a count of a number of edges between the first community and the second community.

In some embodiments, the processor is configured to determine the attractive forces between the first community and the second community or repulsive forces that act between all pairs of super nodes by iteratively determining resulting forces on each super node and attempts to move the super nodes closer to an equilibrium state by (i) simulating the coarse graph as a physical system, (ii) considering each super node as a repelling object, and each second super edge as a spring connecting the two super nodes, wherein the resulting forces comprise the repulsive forces or the attractive forces.

In some embodiments, the processor is configured to determine coordinates of each node in the at least one community by varying a distance from the spiral center and an angle of rotation, wherein the angle of rotation is calculated by a perimeter of a circle whose radius is a ratio of a maximum radius of any spiral and a maximum number of nodes that are placed in any spiral.

A system and method for visualizing large graph data using spirals. The system and method are advantageous for data analytics, especially in analysing the large graph data obtained from social media. Using this visualization through spirals, large graphs can be visualized effectively. The system can be run on server, so that the system reduces the cost of both hardware and software components, and also the hardware components consume less space. The system does not require any special kind of additional devices. It also aids in identifying the important or influential nodes and characterizes the network structure. It produces the interactive spiral visualization of data with cluttered free images which further improves the interpretation and understanding of concluding remarks from the collected data.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4A is an exemplary diagram of a visualization of large graph data associated with communities using spirals according to some embodiments herein;

DETAILED DESCRIPTION OF PREFERRED EMBODIMENTS

Figure 1:
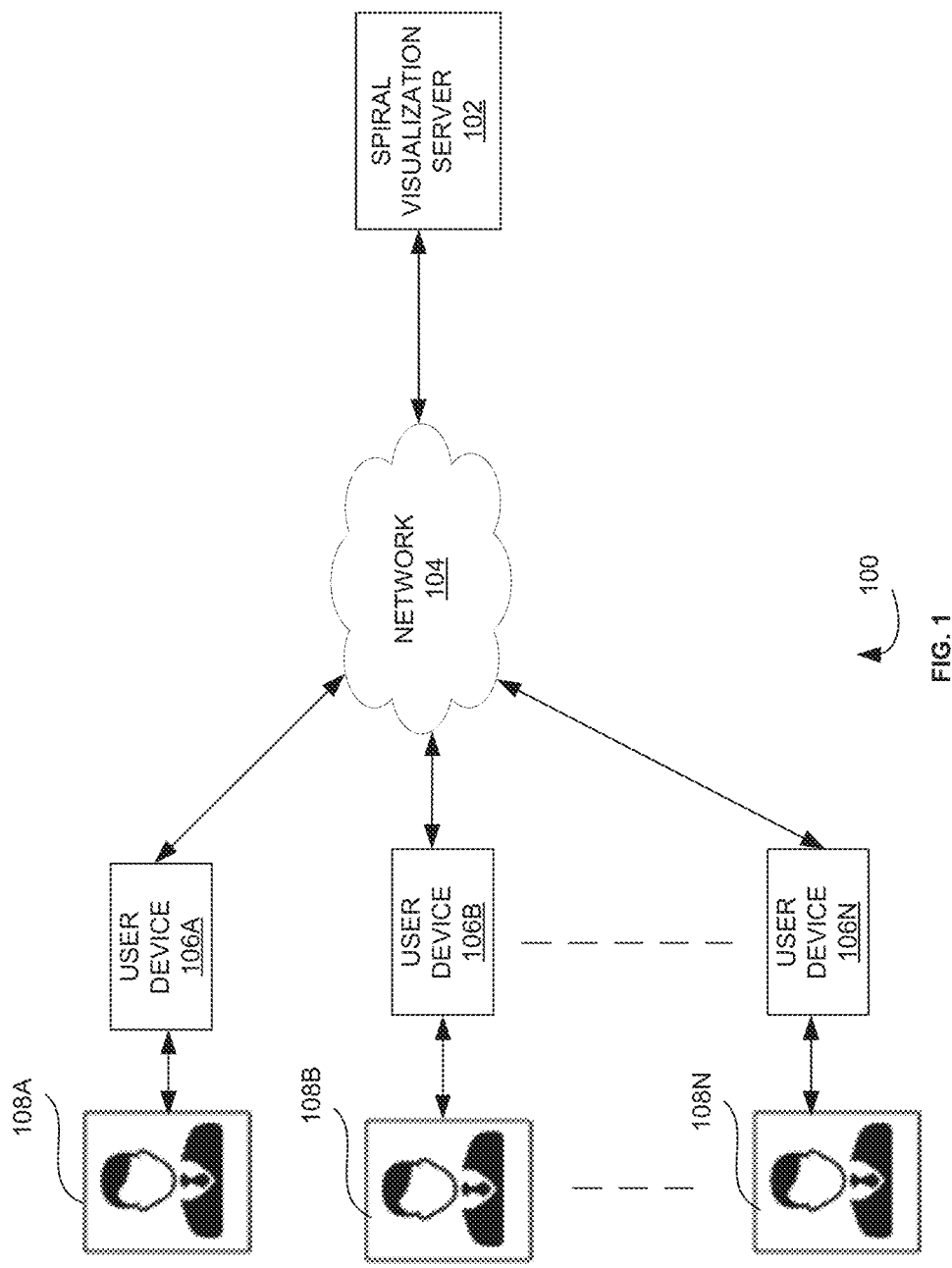
FIG. 1 is a block diagram of a system for generating a visualization of large graph data associated with communities using spirals to reduce visual clutter according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a system and method for generating a visualization of large graph data associated with communities using spirals to reduce visual clutter according to some embodiments herein, referring now to the drawings, and more particularly to FIGS. 1 through 6, where similar reference characters denote corresponding features consistently throughout the figures, preferred embodiments are shown.

FIG. 1 is a block diagram of a system for generating a visualization of large graph data associated with communities using spirals to reduce visual clutter according to some embodiments herein. The system 100 includes a spiral visualization server 102, a network 104, one or more user devices 106A-N, and one or more users 108 A-N. The user device 106 may be a mobile phone, a smartphone, a laptop, a hand-held device, a smart wearable device, a kindle, a PDA (Personal Digital Assistant), a tablet, a computer, or an electronic notebook. The spiral visualization server 102 obtains the input graph data. The input graph data may be from social media. The spiral visualization server 102 obtains input graph data through the network 104. The network may be a local area network (LAN), a wide area network (WAN), a public network, a private network, a proprietary network, a public telephone switched network (PSTN), the Internet, a wireless network, a virtual network, or any combination thereof. The spiral visualization server 108 comprises a memory 110 that stores a set of instructions and a processor 112 that is configured to execute the set of instructions to perform one or more operations.

The spiral visualization server 102 generates communities by grouping nodes associated with a graph structure of data networks associated with input graph data using a community detection method. The input graph data includes data that is represented as the graph structure of data networks. The graph structure includes the nodes, and edges that represent interconnections between the nodes. In some embodiments, the community detection algorithm may be Louvain algorithms.

For example, like a social media platform, the spiral visualization server 102 generates groups or "communities" of one or more users 108A-N. For example, the communities are formed based on how one or more users 108A-N are connected to each other through friendships or interactions, with each user represented as a "node" and their connections as "edges" in a graph. For example, the spiral visualization server 102 groups together one or more users 108A-N who share many common friends, creating communities that represent different social circles or interest groups. The community detection algorithm organizes and interprets the structure of the social network, to analyze and visualize how users are connected and which groups they belong to.

The spiral visualization server 102 configures the nodes in each community in an ascending order based on a centrality measure. The centrality is a measure of an importance of corresponding node. In some embodiments, the centrality measure of each node is determined by determining an inverse of a sum of a shortest path distances from the at least one node to all other nodes in the graph structure. The centrality measure may be determined using Degree Centrality method, Closeness Centrality method, Betweenness Centrality method, and Eigen Centrality method.

The spiral visualization server 102 assesses the importance of each user 108A within these communities, for example. The importance is referred to as "centrality," and is measured using various methods like Degree Centrality, Closeness Centrality, Betweenness Centrality, and Eigen Centrality. For example, with Closeness Centrality, the spiral visualization server 102 calculates how quickly a user 108A can communicate with others in the same community, favoring one or more users 108A-N who can efficiently reach many. The one or more users 108A-N are then organized within each community in ascending order based on their centrality measure. The ordering highlights influential users, such as key connectors or opinion leaders, making it easier for community members and platform administrators to understand the dynamics and key figures within each user group.

In some embodiments, the nodes of the spiral visualization server 102 determines coordinates of each node in the community by varying a distance from the spiral center and an angle of rotation. The angle of rotation is calculated by a perimeter of a circle whose radius is a ratio of a maximum radius of any spiral and a maximum number of nodes that are placed in any spiral.

The spiral visualization server 102 determines the spiral for each community by configuring (i) the corresponding node with a highest centrality measure at a spiral center and (ii) the node in a spiral shape based on the ascending order of the centrality measure along the spiral shape. Hence the central node is the most important node of the community and the spiral visualization server 102 allows users to visualize, explore, and retrieve nodes in large graphs based on the centrality measure.

In some embodiments, the spiral visualization server 102 determines characteristics of the spiral for each community. The characteristics of the spiral for the community include (i) a spiral radius is proportional to a number of nodes in the community, and (ii) a color of the spiral for the community represents an edge density within the community.

The spiral visualization server 102 creates a unique visual representation for the communities by designating the most influential user as the center piece of the community, positioning at the core of a spiral, for example. The central user signifies the heart of the community, for example, and holds a key role in shaping its dynamics. The remaining users are meticulously arranged in a spiral shape, with their positions based on their ascending order of centrality, for example, making it clear how influential each user is within the group. The size of the spiral reflects the community's scale, with larger spirals denoting larger communities. Additionally, the color of each spiral mirrors the intensity of connections and interactions within the community. A vivid color indicates a tightly-knit group, while a lighter color suggests a more loosely connected one. The visual approach empowers users to readily explore and comprehend their communities, identify key figures, assess community size, and gauge the level of interaction, enhancing their engagement within the platform.

The spiral visualization server 102 determines a first super edge for the spiral of the community by (i) removing all edges between two communities to merge as a single edge, and (ii) connecting corresponding two spiral centers of two spirals of the two communities. The first super edge is the edge between two spiral centers and merging all edges in a community as a super edge.

The spiral visualization server 102 generates a coarse graph using super nodes, the first super edge, and a second super edge. The super nodes are determined by merging all nodes of the spiral as a super-node. The second super edge is obtained by representing an edge between two super nodes if there is the edge between a first subset of nodes in a first community and a second subset of nodes in a second community. In some embodiments, the spiral visualization server 102 determines a width or weight of the second super edge by a count of a number of edges between the first community and the second community. The second super edge is the edge between two super nodes.

The coarse graph is a condensed representation by grouping nodes or edges from the original graph, resulting in a more manageable and less complex structure. The simplification process retains key structural properties and relationships while reducing the overall size and intricacy of the graph. Coarse graphs are particularly useful for making large or convoluted networks more accessible, aiding in visualization, analysis, and the identification of higher-level patterns and connections. Super-nodes are a handy tool in graph theory and network analysis, particularly when dealing with large or intricate networks, as the super nodes uncover higher-level patterns and structures while simplifying the overall representation.

The spiral visualization server 102 eliminates complex inter-community connections, consolidating all edges between two communities into a single first super edge. The super edge signifies the connection between the centers of two different spirals, effectively linking separate communities. Subsequently, the spiral visualization server 102 constructs a coarse graph using super nodes, which are formed by merging all individual nodes within each spiral community into singular super nodes. Additionally, the second super edge is established by connecting two super nodes if there is a connection between a subset of nodes in one community and another subset of nodes in a different community. To provide insights into the strength of inter-community connections, the spiral visualization server 102 may assign varying widths or weights to the second super edge based on the number of individual edges between the communities it connects. The simplification process aids users in comprehending the network's structure by representing entire communities as super nodes and visualizing the strength of connections between them through super edges, ultimately facilitating a more intuitive exploration of the network.

For example, super-nodes $S_i$ and $S_j$ represent communities $c_i$ and $c_j$, respectively. There is an edge $E_{ij}$ between the super-nodes $S_i$ and $S_j$ in coarse graph representation if and only if: the edge exists between a subset of nodes belonging to the community $c_i$ and a subset of nodes belonging to the community $c_j$. A weight is assigned to the edge. The weight $w_{ij}$ of $E_{ij}$ is given by a count of all the edges between the communities $c_i$ and $c_j$.

The spiral visualization server 102 configures corresponding spirals of the community on the generated coarse graph based on a weight of the second super edge between the first community and the second community and attractive forces between the first community and the second community to generate the visualization of the large graph data associated with the community using a standard force-directed layout algorithm. In some embodiments, the spiral visualization server 102 determines the attractive forces between the first community and the second community or repulsive forces that act between all pairs of super nodes by iteratively determining resulting forces on each super node and attempts to move the super nodes closer to an equilibrium state by (i) simulating the coarse graph as a physical system, (ii) considering each super node as a repelling object, and each second super edge as a spring connecting the two super nodes. The resulting forces include the repulsive forces or the attractive forces.

The spiral visualization server 102 generates a visual representation of the network's communities on the coarse graph. The configuration of the communities in the visualization is provided by the weight of the second super edge that links the first and second communities. A heavier weight indicates stronger connections between these communities, influencing their spatial arrangement in the visualization. To refine the visual output further, the spiral visualization server 102 may consider attractive forces that represent the magnetic pull between closely connected communities, ensuring that strongly linked groups are positioned in close proximity. To determine the precise arrangement of communities and nodes in the visualization, the spiral visualization server 102 employs a physical system simulation, treating each community as a repelling object and each second super edge as a spring connecting these objects. The simulation calculates the resulting forces on each community or super node, including repulsive and attractive forces, ultimately determining their positions within the visualization. The visual representation vividly illustrates the interactions and interconnectedness between communities, aiding users in comprehending the network's dynamics and relationships with greater clarity and depth.

Figure 2:
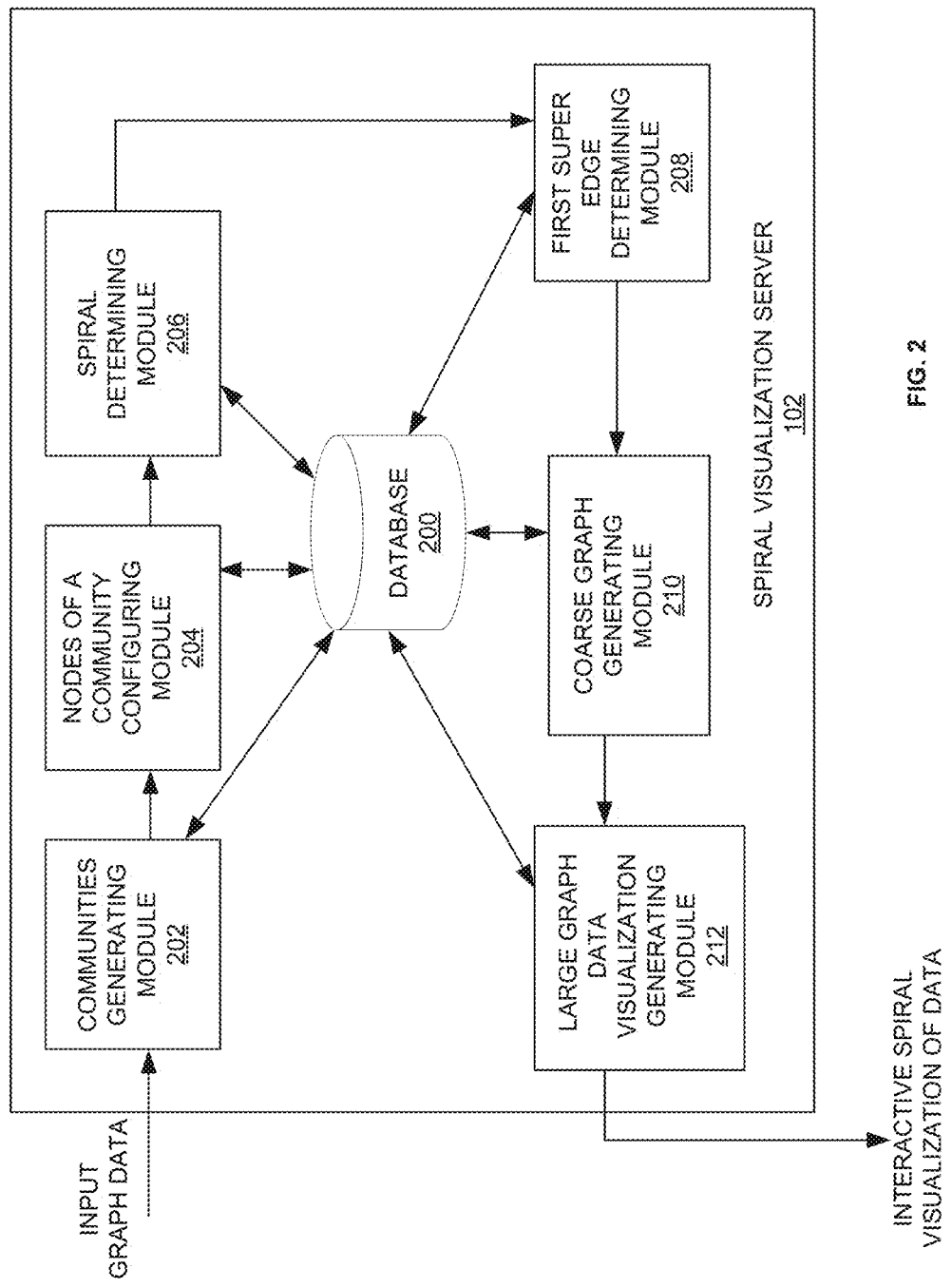
FIG. 2 is a block diagram of a spiral visualization server according to some embodiments herein.

FIG. 2 is a block diagram of a spiral visualization server 102 according to some embodiments herein. The spiral visualization server 102 includes a database 200, communities generating module 202, a nodes of a community configuring module 204, a spiral determining module 206, a first edge determining module 208, a coarse graph generating module 210, and an large graph data visualization generating module 212. The database 200 may be communicatively connected with one or more modules of the spiral visualization server 102.

The communities generating module 202 generates communities by grouping nodes associated with a graph structure of data networks associated with input graph data using a community detection method. The input graph data includes data that is represented as the graph structure of data networks. The graph structure includes the nodes, and edges that represent interconnections between the nodes. In some embodiments, the community detection algorithm may be Louvain algorithms.

Each community is a subset of nodes that are more connected within than the rest of the nodes. Community detection and analysis may reveal the number of different groups or modules present in the data networks.

The nodes of a community configuring module 204 configures the nodes in each community in an ascending order based on a centrality measure. The centrality is a measure of an importance of corresponding node. In some embodiments, the centrality measure of each node is determined by determining an inverse of a sum of a shortest path distances from the at least one node to all other nodes in the graph structure. The centrality measure may be determined using the Degree Centrality method, Closeness Centrality method, Betweenness Centrality method, and Eigen Centrality method.

In some embodiments, the nodes of a community configuring module 204 determines the coordinates of each node in the community by varying a distance from the spiral center and an angle of rotation. The angle of rotation is calculated by a perimeter of a circle whose radius is a ratio of a maximum radius of any spiral and a maximum number of nodes that are placed in any spiral.

The spiral determining module 206 determines the spiral for each community by configuring (i) the corresponding node with a highest centrality measure at a spiral center and (ii) the node in a spiral shape based on the ascending order of the centrality measure along the spiral shape. Hence the central node is the most important node of the community and the spiral determining module 206 allows users to visualize, explore and retrieve nodes in large graphs based on the centrality measure.

In some embodiments, the spiral determining module 206 determines characteristics of the spiral for each community. The characteristics of the spiral for the community include (i) a spiral radius is proportional to a number of nodes in the community, and (ii) a color of the spiral for the community represents an edge density within the community.

The first edge determining module 208 determines a first super edge for the spiral of the community by (i) removing all edges between two communities to merge as a single edge, and (ii) connecting corresponding two spiral centers of two spirals of the two communities.

The coarse graph generating module 210 generates a coarse graph using super nodes, the first super edge, and a second super edge. The super nodes are determined by merging all nodes of the spiral as a super-node. The second super edge is obtained by representing an edge between two super nodes if there is the edge between a first subset of nodes in a first community and a second subset of nodes in a second community. In some embodiments, the coarse graph generating module 210 determines a width or weight of the second super edge by a count of a number of edges between the first community and the second community.

In some embodiments, the coarse graph generating module 210 determines the attractive forces between the first community and the second community or repulsive forces that act between all pairs of super nodes by iteratively determining resulting forces on each super node and attempts to move the super nodes closer to an equilibrium state by (i) simulating the coarse graph as a physical system, (ii) considering each super node as a repelling object, and each second super edge as a spring connecting the two super nodes. The resulting forces include the repulsive forces or the attractive forces The large graph data visualization generating module 212 configures corresponding spirals of the community on the generated coarse graph based on a weight of the second super edge between the first community and the second community and attractive forces between the first community and the second community to generate the visualization of the large graph data associated with the community using a standard force-directed layout algorithm.

In some embodiments, the large graph data visualization generating module 212 visualizes the spiral using interactive features comprising a tooltip, an on-hover highlight, a zooming and panning, and a click on the at least one spiral.

Tooltip: When the user hovers the mouse on the node in the spiral visualization, a rectangular box appears containing additional information like node-id, attribute values, centrality value, etc. The tooltip is helpful as a user can get detailed information in textual form without cluttering the visualization.

On-hover highlight: When the user hovers the mouse on the node in the spiral visualization, its adjacent nodes get highlighted by changing the color of the adjacent nodes. Two nodes are adjacent if they are connected through an edge. This interactive feature can help users understand a node's role in the network and how it is connected to other nodes of the same or different communities.

Zooming and Panning: Zooming enables users to re-scale the visualization to obtain different levels of details. Zooming makes a specific area larger; the user can then pan to change the viewpoint of the visualization. Thus, panning can be used to access the hidden parts of the zoomed view. Finally, the zoom-out technique can be used to re-orient the visualization.

Clicking on the Spiral: When a user clicks on a spiral, the user can see the zoomed version of the Spiral in a side window. The side window also shows the details of the community represented by the clicked or selected Spiral. The detailed information includes centrality distribution in the community, min and max centrality in the community, the density of edges in the community, the number of nodes in the community, etc.

The user can interactively visualize the adjacent nodes by hovering over the node of interest. When a user hovers over a node in the spiral visualization, all its adjacent nodes (within the same spiral and other spirals) are highlighted by changing the colour of the neighboring nodes.

Figure 3:
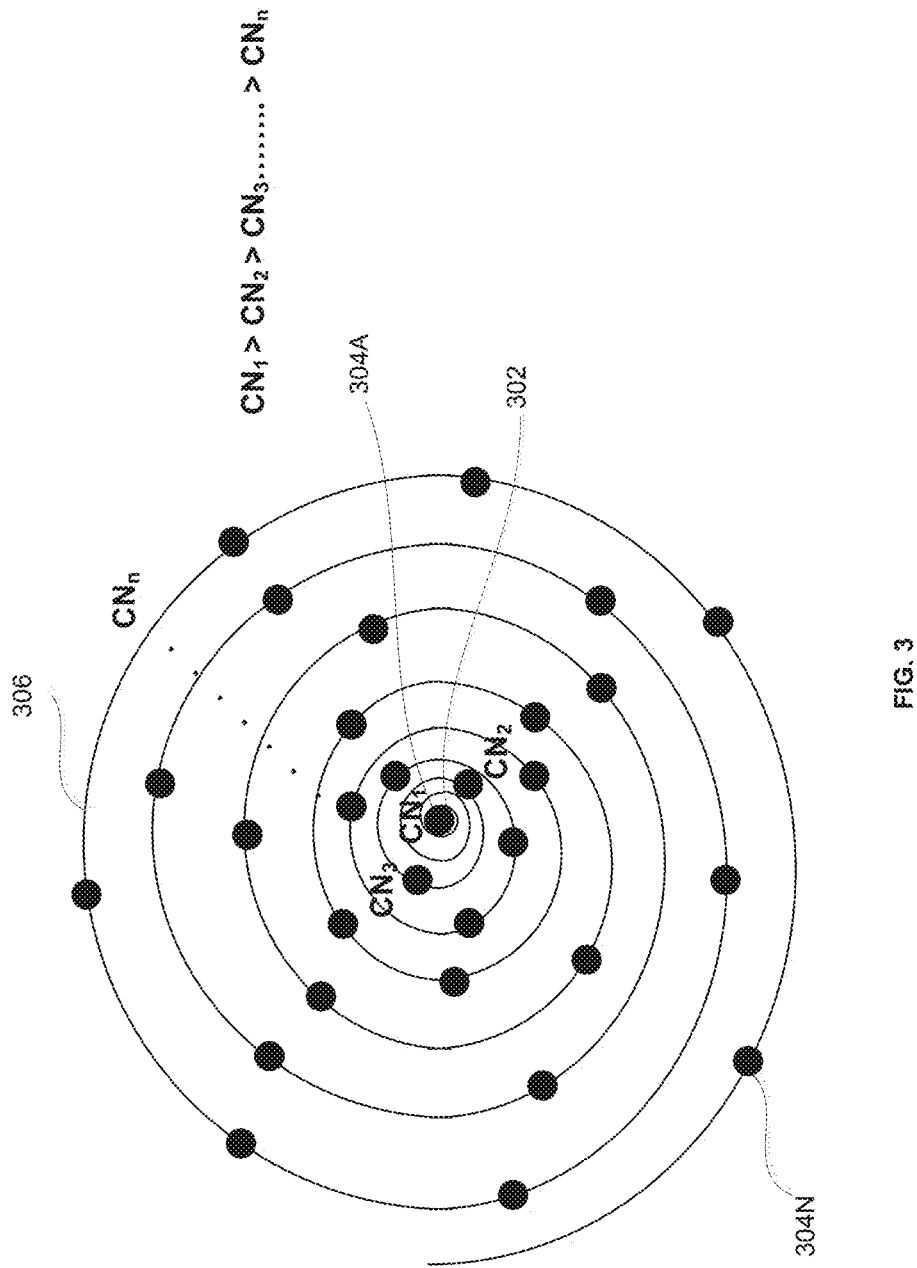
FIG. 3 is an exemplary arrangement of nodes in a spiral based on centrality according to some embodiments herein.

FIG. 3 is an exemplary arrangement of nodes in a spiral based on centrality according to some embodiments herein. The exemplary arrangement includes nodes 304A-N in a spiral 306. The nodes 304A-N are arranged based on centrality. The centrality may give the importance of each node. The centrality 302 is measured using some standard centrality measures like the degree of the node, closeness, betweenness, and eigenvector centrality, for example.

The spiral 306 is generated by placing the nodes such that the highest centrality node 304A is placed at the centermost part of the spiral 306 that is spiral center and the lowest centrality node 304N is placed at the outermost part of the spiral 306. Hence, the nodes 304A-N are arranged with ascending order of centrality measure along the spiral 306. The parameters of generated spiral 306 are defined. The parameters may be maximum radius, maximum number of nodes, maximum number of coils. Each node 303A is placed in the spiral 306 by varying the parameters of the spiral, i. distance from the center of the spiral ii. an angle of rotation.

The distance from the center of the spiral is calculated using the following equation, Distance from the center of spiral=(max.radius of the spiral)/(max.no.of nodes)

The angle of rotation is calculated using the following equation,

Angle of rotation=2π×max.no.of coilsmax.no.of nodes

Both, the distance from the center of the spiral and the angle of rotation are used to obtain $(x_{i,j}, y_{i,j})$ i.e., $j^{th}$ coordinate of $i^{th}$ community, where j represents the index of ordered nodes belonging to a community.

$x_{i,j} \leftarrow c_{i,x}+(j \times \text{distance from the center of spiral})\cos(j \times \text{angle of rotation})$ $y_{i,j} \leftarrow c_{i,y}+(j \times \text{distance from the center of spiral})\sin(j \times \text{angle of rotation})$ where $c_{i,x}$ and $c_{i,y}$ denotes x and y coordinates of the spiral center of $i^{th}$ community.

In some embodiments, the nodes belonging to a community are placed in a spiral shape starting from the center of the spiral. Thus, the nodes are arranged with ascending order of centrality measure along the spiral so that the centermost node 304A has the highest centrality. In this way, a community's most important or central node 304A falls near the center of the spiral. $CN_1$ is the centrality of the centermost node and $CN_n$ is the centrality of the outermost node at the spiral. $CN_2$, $CN_3$ and etc are the centrality of the nodes placed in between $CN_1$ and $CN_n$ in an ordered manner. Hence the relationship between the centrality of the nodes is described as follows, $CN_1 > CN_2 > CN_3 \ldots > CN_n$ Maximum radius, Maximum nodes and maximum no. of coil are the three parameters that need to be fixed to obtain node coordinates along a spiral in the spiral visualization. The maximum radius is the maximum radius any spiral can have in the spiral visualization. The maximum number of nodes that can be arranged or placed in any spiral, The maximum number of coils or loops any spiral can have in the spiral visualization.

FIG. 4A is an exemplary diagram of a visualization of large graph data associated with communities using spirals according to some embodiments herein. The schematic diagram 402 depicts the spiral visualization for the corresponding input graph data. The spiral visualization comprises of spirals 406 and edges 406A-N with logical linking. Each spiral represents a community. Each edge represents the existence of inter-community edges between two communities. Spirals have different sizes or radius and colour of spirals. The colour of the spiral represents density of edges in a community and the radius of the spiral represents the size of the community i.e number of nodes in the community. To minimize visual clutter due to edge crossing all the inter-community edges between two communities are merged and visualized as one edge connecting the centers of the respective two spirals (replicating edges in coarse graph representation). This improves the readability of graph visualization and gives the intuition of interconnections between two communities.

Moreover, edge lengths can be used to interpret the number of interconnections between two spirals/communities. For example, consider a Spiral SPi and all its adjacent spirals. The adjacent spirals to spiral SPi are the ones to which SPi is connected through an edge. Comparing the edge length of all the adjacent spirals to SPi, the spiral visualization server 102 can interpret which community is strongly or weakly connected to SPi. The edge length whose length is short represents a strong connection (i.e., more number of inter-community edges) between communities, and the edge length whose length is large length represents a weak connection ((i.e., less number of inter-community edges)). The edge width is directly proportional to the number of interconnections. The edges are also interactive, therefore the user 108A can click on an edge to obtain information like what communities are connected through the edge and the exact number of inter-community connections.

Figure 4B:
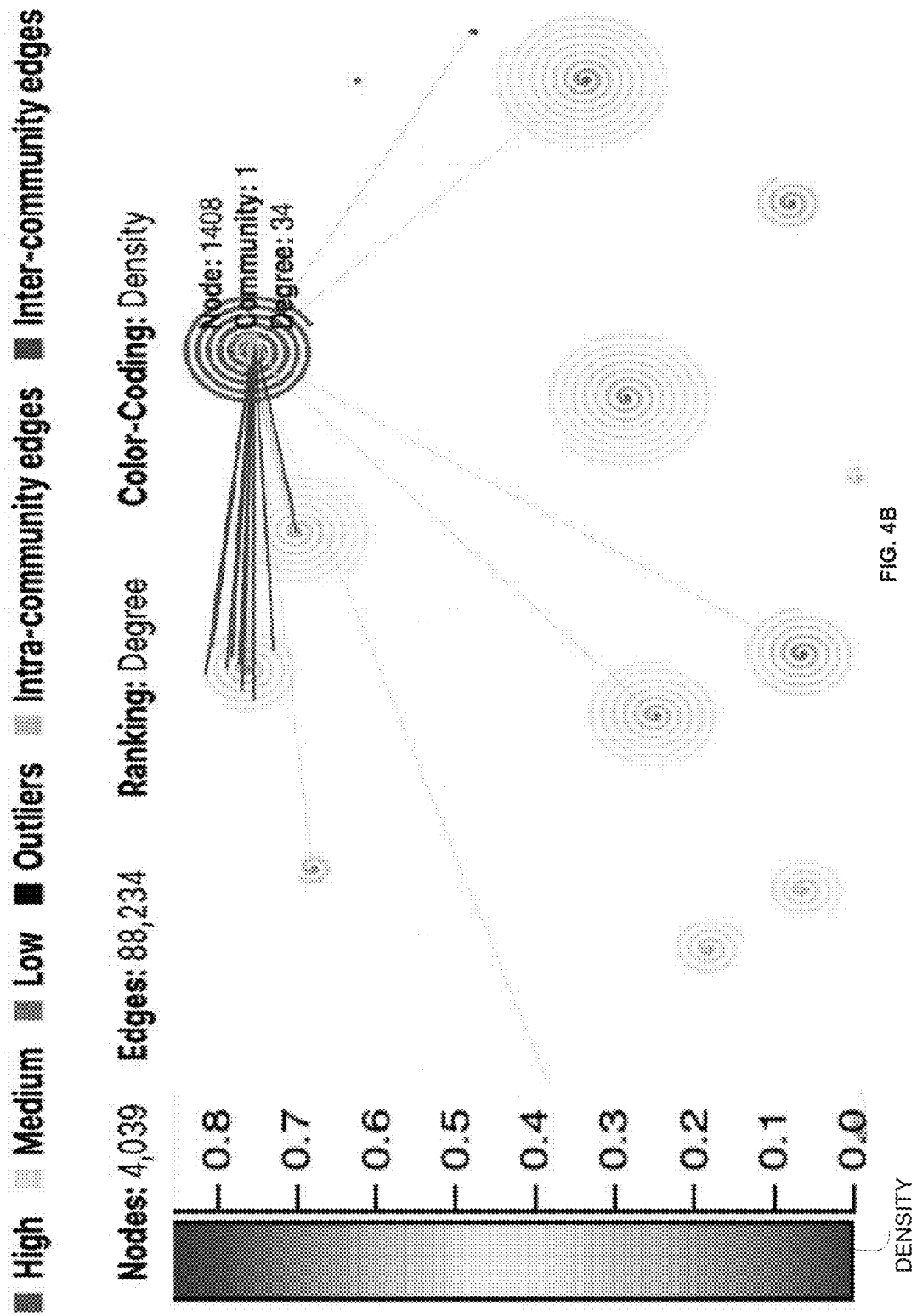
FIG. 4B is an exemplary representation of a color-coding visualization of large graph data associated with communities using spirals according to some embodiments herein.

FIG. 4B is an exemplary representation of a color coding visualization of large graph data associated with communities using spirals according to some embodiments herein. The exemplary representation depicts a node of interest. When the user hovers over a node of interest, all the edges to its adjacent nodes (within the same Spiral or in different Spirals) are drawn as shown in the figure. The edges connecting intra-community adjacent nodes (i.e., the nodes within the same Spiral) are drawn using cyan color, while those connecting inter-community adjacent nodes (i.e., nodes in other Spirals) are drawn using blue color. The exemplary representation depicts density-based color coding to visualize community density. The density ranges from 0 to 0.8 as shown in the figure. The nodes in the spiral are colored using red, green, and yellow to represent low, medium, and high centrality measure values. Outliers or very high centrality are represented by black color. The exemplary representation depicts a number of nodes 4039, and number of edges 88,234, ranking as degree, and color coding as density.

The exemplary representation depicts a node that is numbered 1408 in community 1 and has a degree of 34 and intra-community edges of the node 1408 are shown in blue color and the inter-community edges are shown in cyan color.

Figure 5:
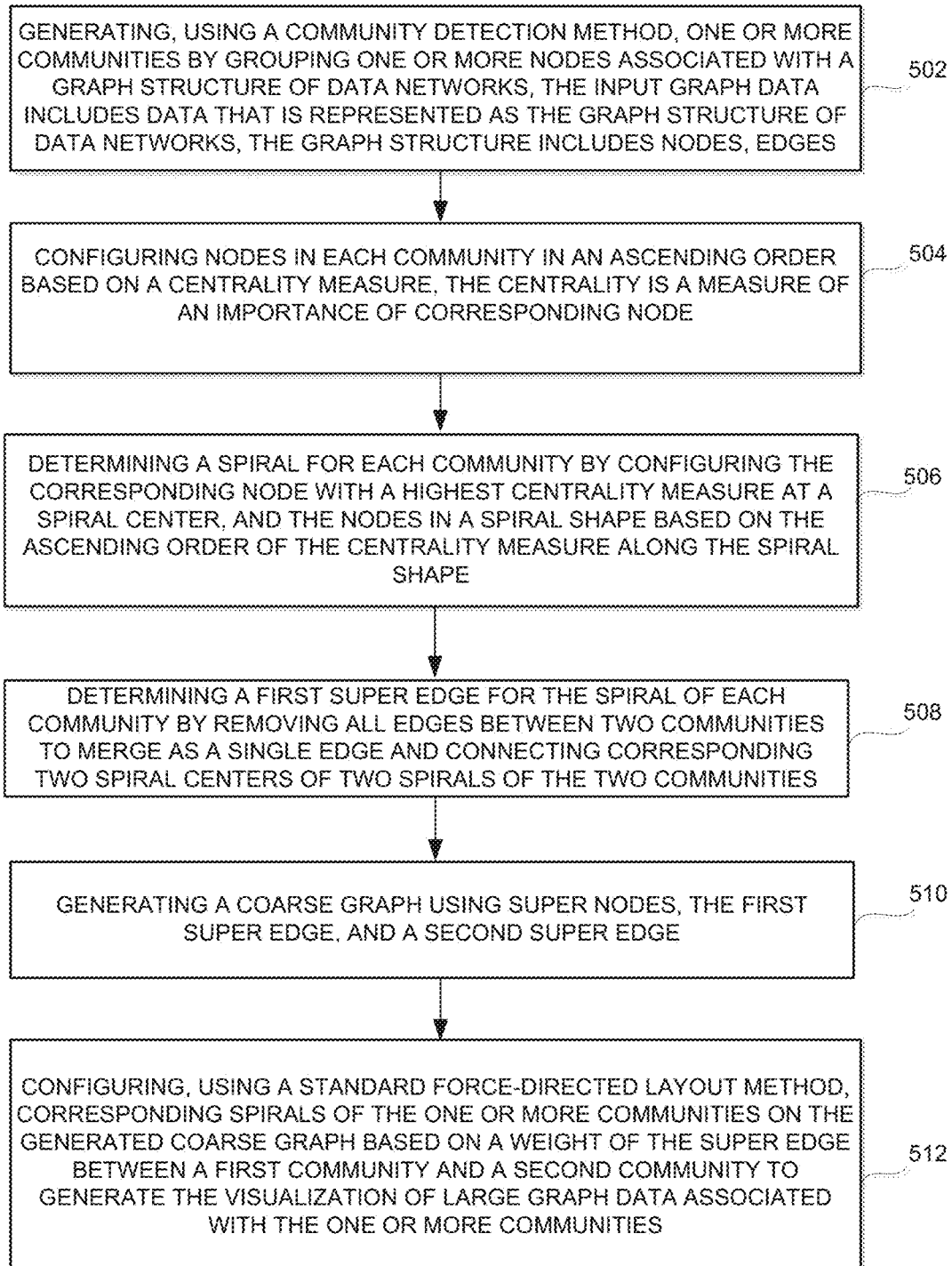
FIG. 5 is a flow diagram that illustrates a method for generating a visualization of large graph data associated with communities using spirals to reduce visual clutter in accordance with the embodiments herein.

FIG. 5 is a flow diagram that illustrates a method for generating a visualization of large graph data associated with communities using spirals to reduce visual clutter in accordance with the embodiments herein.

At step 502, a method includes, generating, using a community detection method, the at least one community by grouping a plurality of nodes associated with a graph structure of data networks associated with input graph data, the input graph data comprises data that is represented as the graph structure of data networks, the graph structure comprises the nodes, and edges that represent interconnections between the nodes. At step 504, configuring the at least one node in the at least one community in an ascending order based on a centrality measure, the centrality is a measure of an importance of corresponding node. At step 506, determining the at least one spiral for each community by configuring (a) the corresponding node with a highest centrality measure at a spiral center and (b) the nodes in a spiral shape based on the ascending order of the centrality measure along the spiral shape. At step 508, the method includes, determining a first super edge for the spiral of the community by (m) removing all edges between two communities to merge as a single edge, and (n) connecting corresponding two spiral centers of two spirals of the two communities.

At step 510, the method includes, generating a coarse graph using super nodes, the first super edge, and a second super edge, the super nodes are determined by (x) merging all nodes of the at least one spiral as a super-node, and the second super edge is obtained by representing an edge between two super nodes if there is the edge between a first subset of nodes in a first community and a second subset of nodes in a second community. At step 512, the method includes, configuring, using a standard force-directed layout algorithm, corresponding spirals of the one or more communities on the generated coarse graph based on a weight of the second super edge between the first community and the second community and attractive forces between the first community and the second community to generate the visualization of the large graph data associated with the at least one community.

In some embodiments, the method includes determining the centrality measure of each node by determining an inverse of a sum of a shortest path distances from a node to all other nodes in the graph structure.

In some embodiments, the method further includes determining characteristics of the at least one spiral for each community, wherein the characteristics of the at least one spiral for each community comprises (i) a spiral radius is proportional to a number of nodes in the corresponding community, and (ii) a color of the at least one spiral for each community represents an edge density within the corresponding community.

In some embodiments, the method further includes visualizing the at least one spiral using interactive features comprising a tooltip, an on-hover highlight, a zooming and panning, and a click on the at least one spiral.

In some embodiments, the method further includes determining a weight of the second super edge by summing all edges between the first community and the second community.

In some embodiments, the method further includes the attractive forces between the first community and the second community or repulsive forces that act between all pairs of super nodes by iteratively determining resulting forces on each super node and attempts to move the super nodes closer to an equilibrium state by (i) simulating the coarse graph as a physical system, (ii) considering each super node as a repelling object, and each second super edge as a spring connecting the two super nodes, wherein the resulting forces comprise the repulsive forces or the attractive forces.

In some embodiments, the method further includes determining coordinates of each node in each community by varying a distance from the spiral center and an angle of rotation, wherein the angle of rotation is calculated by a perimeter of a circle whose radius is a ratio of a maximum radius of any spiral and a maximum number of nodes that are placed in any spiral.

Figure 6:
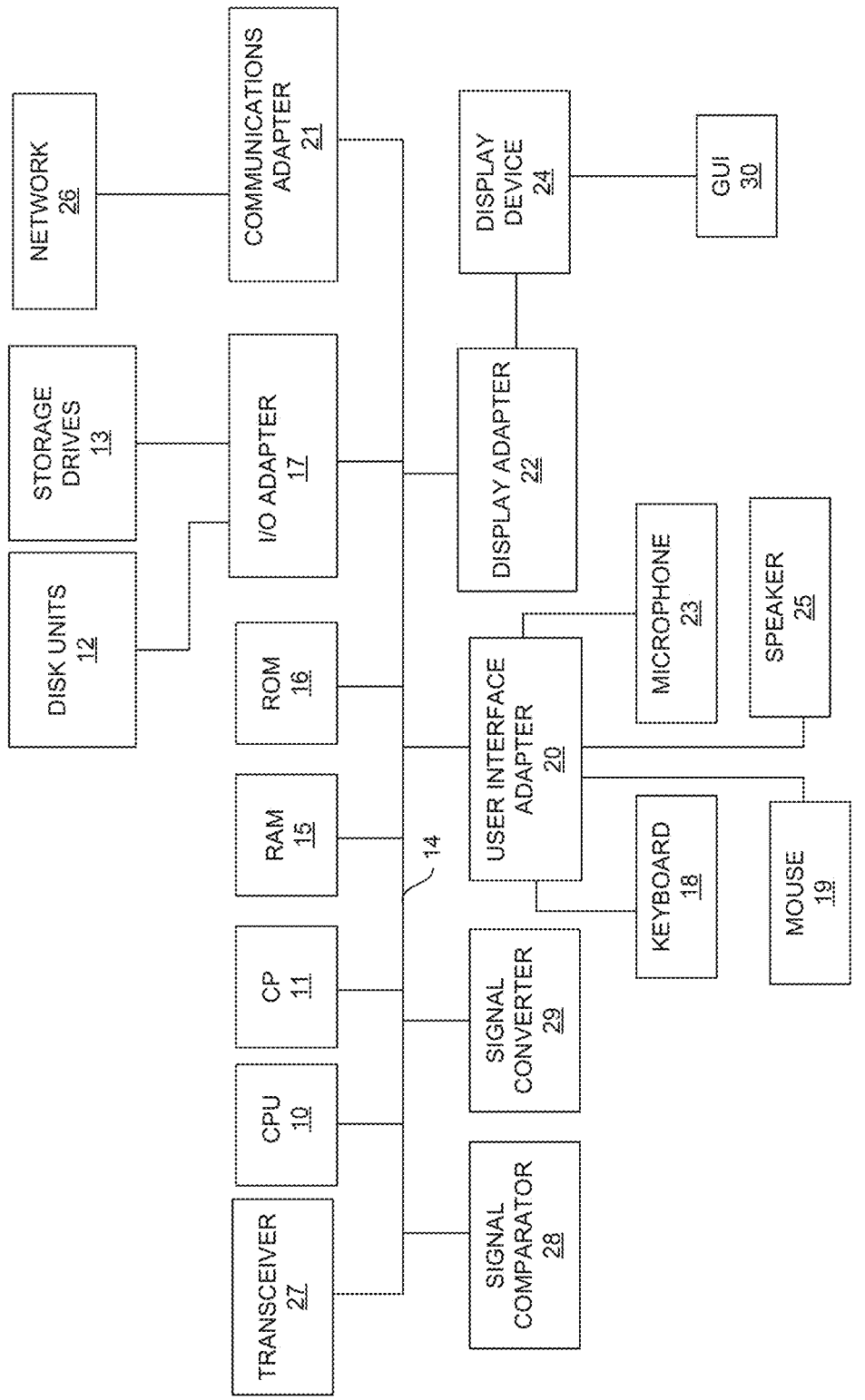
FIG. 6 is a schematic diagram of a computer architecture in accordance with the embodiments herein.

FIG. 6 is a schematic diagram of a computer architecture in accordance with the embodiments herein. A representative hardware environment for practicing the embodiments herein is depicted in FIG. 6, with reference to FIGS. 1 through 5. This schematic drawing illustrates a hardware configuration of a spiral visualization server 102/computer system/computing device in accordance with the embodiments herein. The system includes at least one processing device CPU 10 that may be interconnected via system bus 14 to various devices such as a random-access memory (RAM) 15, read-only memory (ROM) 16, and an input/output (I/O) adapter 17. The I/O adapter 17 can connect to peripheral devices, such as disk units 12 and program storage devices 13 that are readable by the system. The system can read the inventive instructions on the program storage devices 13 and follow these instructions to execute the methodology of the embodiments herein. The system further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 20 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A processor-implemented method for generating a visualization of large graph data associated with at least one community using at least one spiral to reduce visual clutter, wherein the method comprises:

generating, using a community detection method, the at least one community by grouping a plurality of nodes associated with a graph structure of data networks associated with input graph data, wherein the graph structure comprises the plurality of nodes, and edges that represent interconnections between the plurality of nodes;

configuring at least one node, from the plurality of nodes, in the at least one community in an ascending order based on a centrality measure, wherein the centrality measure is a measure of an importance of a corresponding node;

determining the at least one spiral for the at least one community by configuring (i) the corresponding node with a highest centrality measure at a spiral center and (ii) the at least one node in a spiral shape based on the ascending order of the centrality measure along the spiral shape;

determining a first super edge for the at least one spiral of the at least one community by (i) removing all edges between two communities to merge as a single edge, and (ii) connecting corresponding two spiral centers of two spirals of the two communities;

generating a coarse graph using super nodes, the first super edge, and a second super edge, wherein the super nodes are determined by merging all nodes of the at least one spiral as a super-node, and the second super edge is obtained by representing an edge between two super nodes based on the presence of an edge between a first subset of nodes in a first community and a second subset of nodes in a second community; and configuring, using a standard force-directed layout algorithm, corresponding spirals of the at least one community on the generated coarse graph based on a weight of the second super edge between the first community and the second community and attractive forces between the first community and the second community to generate the visualization of the large graph data associated with the at least one community.

2. The method of claim 1, wherein the method further comprises determining the centrality measure of the at least one node by determining an inverse of a sum of a shortest path distance from the at least one node to all other nodes in the graph structure.

3. The method of claim 1, wherein the method further comprises determining characteristics of the at least one spiral for each community, wherein the characteristics of the at least one spiral for the at least one community comprises (i) a spiral radius of the at least one spiral that is proportional to a number of nodes in the at least one community, and (ii) a color of the at least one spiral for the at least one community that represents an edge density within the at least one community.

4. The method of claim 1, wherein the method further comprises visualizing the at least one spiral using interactive features comprising a tooltip, an on-hover highlight, a zooming and panning, and a click on the at least one spiral.

5. The method of claim 1, wherein the method further comprises determining a width or weight of the second super edge based on a count of a number of edges between the first community and the second community.

6. The method of claim 1, wherein the method further comprises determining the attractive forces between the first community and the second community or repulsive forces that act between all pairs of super nodes by iteratively determining resulting forces on each super node and moving the super nodes closer to an equilibrium state, by: (i) simulating the coarse graph as a physical system, (ii) considering each super node as a repelling object, and the second super edge as a spring connecting the two super nodes, wherein the resulting forces comprise the repulsive forces or the attractive forces.

7. The method of claim 1, wherein the method further comprises determining coordinates of each node in the at least one community by varying a distance from the spiral center and an angle of rotation, wherein the angle of rotation is calculated based on a perimeter of a circle whose radius is a ratio of a maximum radius of any spiral in the at least one community and a maximum number of nodes that are placed in any spiral of the at least one community.

8. One or more non-transitory computer-readable storage medium storing the one or more sequence of instructions, which when executed by the one or more processors, causes to perform a method for generating a visualization of large graph data associated with at least one community using at least one spiral to reduce visual clutter, wherein the method comprises:

generating, using a community detection method, the at least one community by grouping a plurality of nodes associated with a graph structure of data networks associated with input graph data, wherein the graph structure comprises the plurality of nodes, and edges that represent interconnections between the plurality of nodes;

configuring at least one node, from the plurality of nodes, in the at least one community in an ascending order based on a centrality measure, wherein the centrality measure is a measure of an importance of a corresponding node;

determining the at least one spiral for the at least one community by configuring (i) the corresponding node with a highest centrality measure at a spiral center and (ii) the at least one node in a spiral shape based on the ascending order of the centrality measure along the spiral shape;

determining a first super edge for the at least one spiral of the at least one community by (i) removing all edges between two communities to merge as a single edge, and (ii) connecting corresponding two spiral centers of two spirals of the two communities;

generating a coarse graph using super nodes, the first super edge, and a second super edge, wherein the super nodes are determined by merging all nodes of the at least one spiral as a super-node, and the second super edge is obtained by representing an edge between two super nodes based on the presence of an edge between a first subset of nodes in a first community and a second subset of nodes in a second community; and configuring, using a standard force-directed layout algorithm, corresponding spirals of the at least one community on the generated coarse graph based on a weight of the second super edge between the first community and the second community and attractive forces between the first community and the second community to generate the visualization of the large graph data associated with the at least one community.

9. A system for generating a visualization of large graph data associated with at least one community using at least one spiral to reduce visual clutter comprising:

a device processor; and a non-transitory computer-readable storage medium storing one or more sequences of instructions, which when executed by the device processor, causes:

generating, using a community detection method, the at least one community by grouping a plurality of nodes associated with a graph structure of data networks associated with input graph data, wherein the graph structure comprises the plurality of nodes, and edges that represent interconnections between the plurality of nodes;

configuring at least one node, from the plurality of nodes, in the at least one community in an ascending order based on a centrality measure, wherein the centrality measure is a measure of an importance of a corresponding node;

determining the at least one spiral for the at least one community by configuring (i) the corresponding node with a highest centrality measure at a spiral center and (ii) the at least one node in a spiral shape based on the ascending order of the centrality measure along the spiral shape;

determining a first super edge for the at least one spiral of the at least one community by (i) removing all edges between two communities to merge as a single edge, and (ii) connecting corresponding two spiral centers of two spirals of the two communities;

generating a coarse graph using super nodes, the first super edge, and a second super edge, wherein the super nodes are determined by merging all nodes of the at least one spiral as a super-node, and the second super edge is obtained by representing an edge between two super nodes based on the presence of an edge between a first subset of nodes in a first community and a second subset of nodes in a second community; and configuring, using a standard force-directed layout algorithm, corresponding spirals of the at least one community on the generated coarse graph based on a weight of the second super edge between the first community and the second community and attractive forces between the first community and the second community to generate the visualization of the large graph data associated with the at least one community.

10. The system of claim 9, wherein the device processor is further configured to determine the centrality measure of the at least one node by determining an inverse of a sum of a shortest path distance from the at least one node to all other nodes in the graph structure.

11. The system of claim 9, wherein the device processor is further configured to determine characteristics of the at least one spiral for each community, wherein the characteristics of the at least one spiral for the at least one community comprises (i) a spiral radius of the at least one spiral that is proportional to a number of nodes in the at least one community, and (ii) a color of the at least one spiral for the at least one community that represents an edge density within the at least one community.

12. The system of claim 9, wherein the device processor is further configured to visualize the at least one spiral using interactive features comprising a tooltip, an on-hover highlight, a zooming and panning, and a click on the at least one spiral.

13. The system of claim 9, wherein the device processor is further configured to determine a width or weight of the second super edge based on a count of a number of edges between the first community and the second community.

14. The system of claim 9, wherein the device processor is further configured to determine the attractive forces between the first community and the second community or repulsive forces that act between all pairs of super nodes by iteratively determining resulting forces on each super node and moving the super nodes closer to an equilibrium state, by: (i) simulating the coarse graph as a physical system, (ii) considering each super node as a repelling object, and the second super edge as a spring connecting the two super nodes, wherein the resulting forces comprise the repulsive forces or the attractive forces.

15. The system of claim 9, wherein the device processor is further configured to determine coordinates of each node in the at least one community by varying a distance from the spiral center and an angle of rotation, wherein the angle of rotation is calculated based on a perimeter of a circle whose radius is a ratio of a maximum radius of any spiral in the at least one community and a maximum number of nodes that are placed in any spiral of the at least one community.

\* \* \* \* \*